(12) United States Patent
Nakano

(10) Patent No.: US 9,902,264 B2
(45) Date of Patent: Feb. 27, 2018

(54) LEVER DEVICE

(71) Applicant: KABUSHIKI KAISHA TOKAI RIKA DENKI SEISAKUSHO, Aichi (JP)

(72) Inventor: Yohei Nakano, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 47 days.

(21) Appl. No.: 15/039,940

(22) PCT Filed: Mar. 17, 2015

(86) PCT No.: PCT/JP2015/057808
§ 371 (c)(1),
(2) Date: May 27, 2016

(87) PCT Pub. No.: WO2015/146693
PCT Pub. Date: Oct. 1, 2015

(65) Prior Publication Data
US 2017/0106748 A1   Apr. 20, 2017

(30) Foreign Application Priority Data

Mar. 26, 2014 (JP) ................................. 2014-063572

(51) Int. Cl.
*B60K 20/02* (2006.01)
*F16H 59/04* (2006.01)
*F16H 59/02* (2006.01)

(52) U.S. Cl.
CPC ............ *B60K 20/02* (2013.01); *F16H 59/04* (2013.01); *F16H 2059/0269* (2013.01); *F16H 2059/0295* (2013.01)

(58) Field of Classification Search
CPC ......... B60K 20/02; B60K 26/02; F16H 59/02; F16H 59/0278; F16H 59/04;
(Continued)

(56) References Cited

U.S. PATENT DOCUMENTS 4,543,842 A   10/1985   Katayama
4,569,245 A    2/1986   Feldt et al.
(Continued)

FOREIGN PATENT DOCUMENTS

DE   9310527 U1 *  9/1993   ............. F16H 59/04
EP   0413116 A1 *  2/1991   ............. B60K 20/02
(Continued)

OTHER PUBLICATIONS

Machine translation of JP 61-25229 U obtained on Sep. 7, 2017.*
(Continued)

*Primary Examiner* — Adam D Rogers
(74) *Attorney, Agent, or Firm* — Greenblum & Bernstein, P.L.C.

(57) ABSTRACT

A lever device includes a single shaft for mounting a lever section to a housing. The lever section includes a shaft mounting section having an insertion hole. The lever support section of the shaft is disposed within the insertion hole and supports the lever section so that the lever section can move in the first direction and the second direction. A contact section is provided either to the housing and/or the lever section, or between the housing and the lever section. The contact section includes a curved surface which allows the lever section to move in the first direction and the second direction while the housing and the lever section are in contact with each other.

7 Claims, 4 Drawing Sheets

(58) Field of Classification Search
CPC ....... F16H 2059/0269; F16H 2059/026; F16H 2059/0273; F16H 2059/0295; G05G 1/04; G05G 1/12
See application file for complete search history.

(56) References Cited

U.S. PATENT DOCUMENTS

| | | | | |
|---|---|---|---|---|
| 4,597,499 | A * | 7/1986 | Hanula | B61G 7/10 213/50.5 |
| 4,693,135 | A * | 9/1987 | LaRocca et al. | F16H 59/04 74/473.21 |
| 4,873,884 | A * | 10/1989 | Yamada | B60K 20/04 403/114 |
| 5,722,296 | A * | 3/1998 | Nishigai | F16H 59/04 384/206 |
| 6,286,385 | B1 * | 9/2001 | Nishimura | F16H 59/10 180/271 |
| 6,848,560 | B2 * | 2/2005 | Inoue | F16H 59/10 192/220.5 |
| 9,273,775 | B2 * | 3/2016 | Kvarnstrom | F16H 59/105 |
| 2011/0247442 | A1 * | 10/2011 | Trevino | F16H 59/04 74/473.3 |
| 2012/0013487 | A1 * | 1/2012 | Hsu | G05G 9/047 341/20 |

FOREIGN PATENT DOCUMENTS

| | | | | |
|---|---|---|---|---|
| EP | 0728611 | A1 * | 8/1996 | ............ F16H 59/04 |
| JP | 59-58832 | | 4/1984 | |
| JP | 61-25229 | | 2/1986 | |
| JP | 4563832 | | 10/2010 | |

OTHER PUBLICATIONS

International Search Report for International Patent Application PCT/JP2015/057808, dated Jun. 23, 2015, along with English-language translation thereof.
International Preliminary Report on Patentability for PCT/JP2015/057808 dated Sep. 27, 2016.
Translation of Written Opinion of International Searching Authority for PCT/JP2015/057808 dated Jun. 23, 2015.

* cited by examiner

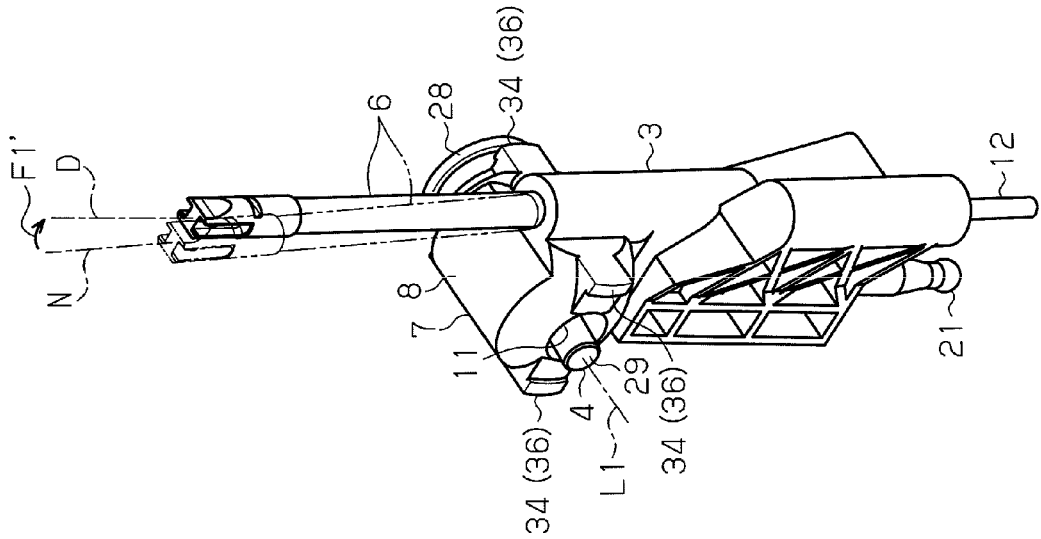
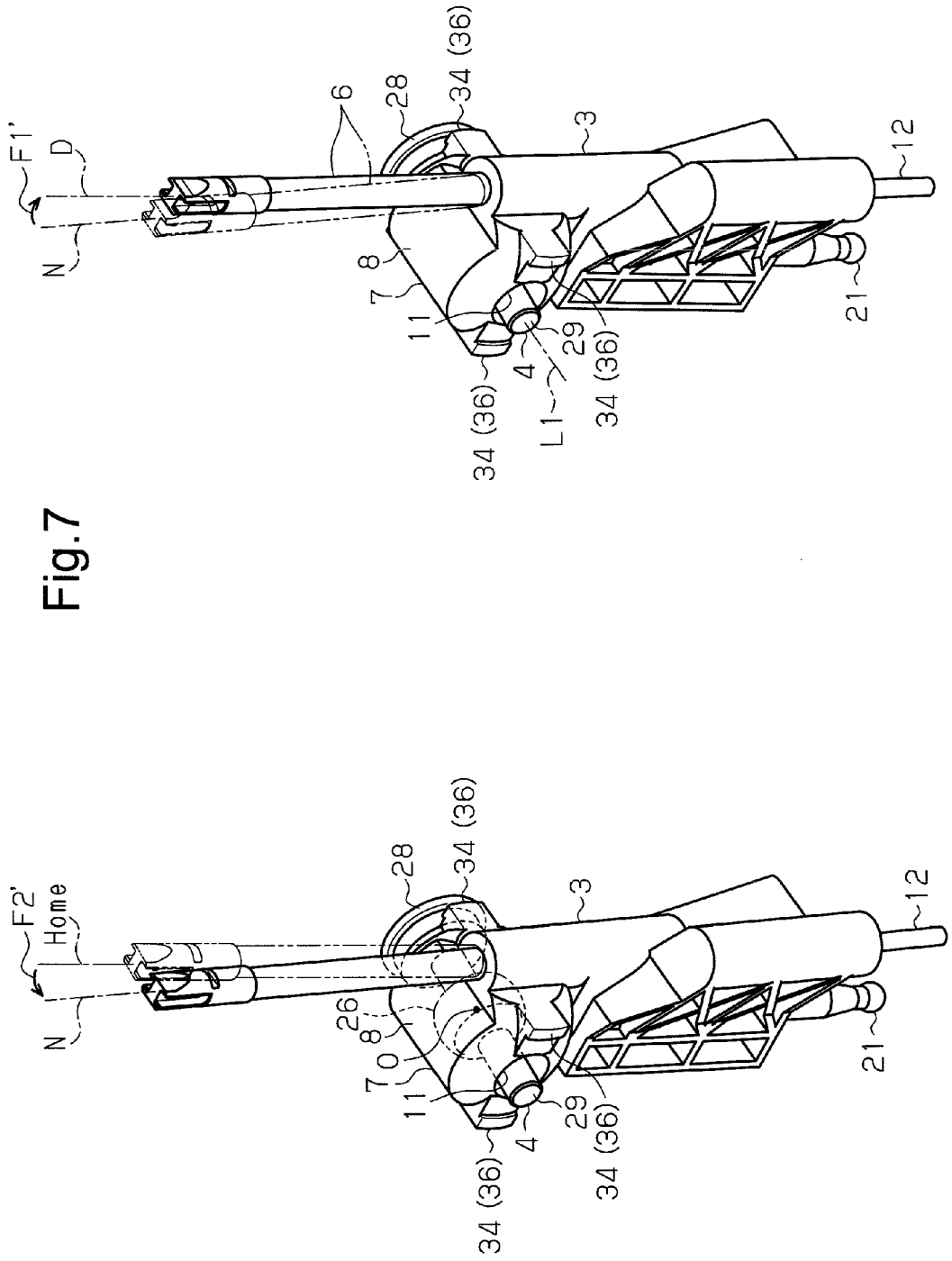
Fig.6
Fig.7

LEVER DEVICE

TECHNICAL FIELD

The present invention relates to a lever device including an operation lever that is operable in at least two intersecting directions.

BACKGROUND ART

Patent document 1 describes an example of a lever device that is included in a vehicle and operated when changing shift positions. The lever device described in patent document 1 includes an operation lever that is operable, for example, in two directions namely, a shift direction that extends in the front-rear direction of the vehicle body and a select direction that is orthogonal to the shift direction. A lever device of a so-called shift-by-wire type sends an electric signal corresponding to the position of the operation lever (hereafter, referred to as the shift position) to a gear change device to change operation states of the gear change device.

PRIOR ART DOCUMENT

Patent Document

Patent Document 1: Japanese Patent No. 4563832

SUMMARY OF THE INVENTION

In order to pivot in the shift direction and the select direction, the operation lever described in patent document 1 needs two pivot shafts. Additionally, a task for coupling the two pivot shafts to the operation lever and the housing of the lever device is necessary when the lever device is assembled.

It is an object of the present invention to provide a lever device that reduces the number of components.

In one aspect of the present invention, a lever device includes a lever, a shaft having a longitudinal axis, a housing that supports the shaft, a shaft coupling portion included in the lever and including an insertion bore through which the shaft is inserted, a lever support included in the shaft, and a contact portion. The lever support is located in the insertion bore of the shaft coupling portion and supports the lever so that the lever is movable in multiple directions including a first direction and a second direction that intersects with the first direction. The contact portion is included in one or each of the housing and the lever or located between the housing and the lever. The contact portion includes a curved surface that allows the lever to move in the first direction and the second direction with the lever and the housing in contact with each other.

In this structure, when the lever is operated in the first direction, the lever pivots about the longitudinal axis of the shaft, and the housing and the lever move in contact with the contact portion. When the lever is operated in the second direction, the lever pivots about a center of the lever support, and the housing and the lever move in contact with the contact portion. Thus, the lever is supported by the single shaft and operable in different directions. This reduces the number of components.

Preferably, in the lever device, the lever support includes a spherical curved surface. In this structure, the lever is pivotally supported and balanced by the spherical curved surface of the lever support.

Preferably, in the lever device, the contact portion is located at opposite sides of the lever. In this structure, the lever is supported by the housing and stabilized by the contact portion located at opposite sides of the lever.

Preferably, in the lever device, the contact portion is included in the shaft coupling portion. In this structure, the contact portion may be entirely or partially formed integrally with the shaft coupling portion. This effectively uses the shaft coupling portion to include the contact portion.

Preferably, in the lever device, the insertion bore of the shaft coupling portion includes a tapered opening adjacent to one end of the shaft. In this structure, when the shaft is inserted into the insertion bore of the shaft coupling portion, the tapered opening guides the insertion of the shaft. Thus, the shaft may be easily inserted into the insertion bore of the shaft coupling portion.

Other aspects and advantages of the invention will become apparent from the following description, taken in conjunction with the accompanying drawings, illustrating by way of example the principles of the invention.

BRIEF DESCRIPTION OF THE DRAWINGS

FIG. 6 is an operation diagram showing a lever operated from the home position to the N position.

FIG. 7 is an operation diagram showing the lever operated from the N position to the D position.

EMBODIMENTS OF THE INVENTION

One embodiment of a lever device will now be described with reference to FIGS. 1 to 7.

Figure 1:
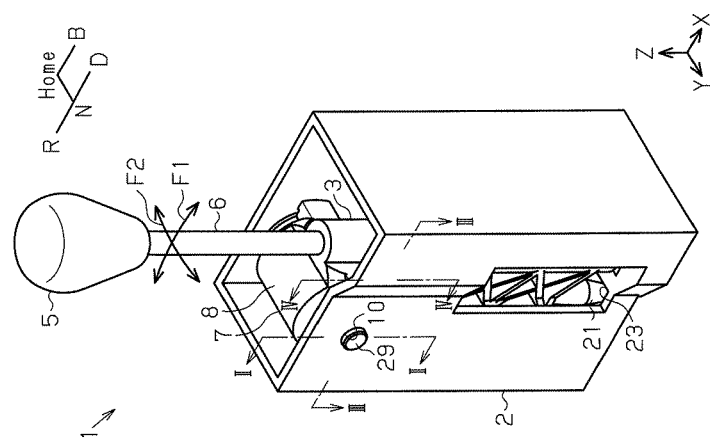
FIG. 1 is a perspective view showing one embodiment of a lever device.

As shown in FIG. 1, a lever device 1 includes a housing 2 and a lever 3. The lever device 1, which is of a so-called shift-by-wire type, sends an electric signal corresponding to an operation position (shift position) of the lever 3 to a gear change device of a vehicle. The housing 2 is, for example, box-shaped.

The lever 3 is operable in different directions. The lever 3 may pivot in two directions, namely, a shift direction (arrow F1 shown in FIG. 1), which may be the front-rear direction of a vehicle body, and a select direction (arrow F2 shown in FIG. 1) that is orthogonal to the shift direction. The shift position includes a home position, a neutral position (N), a drive position (D), a reverse position (R), and a regenerative brake position (B). The lever device 1 is of a momentary type in which the lever 3 automatically returns to the home position from a position other than the home position.

Figure 3:
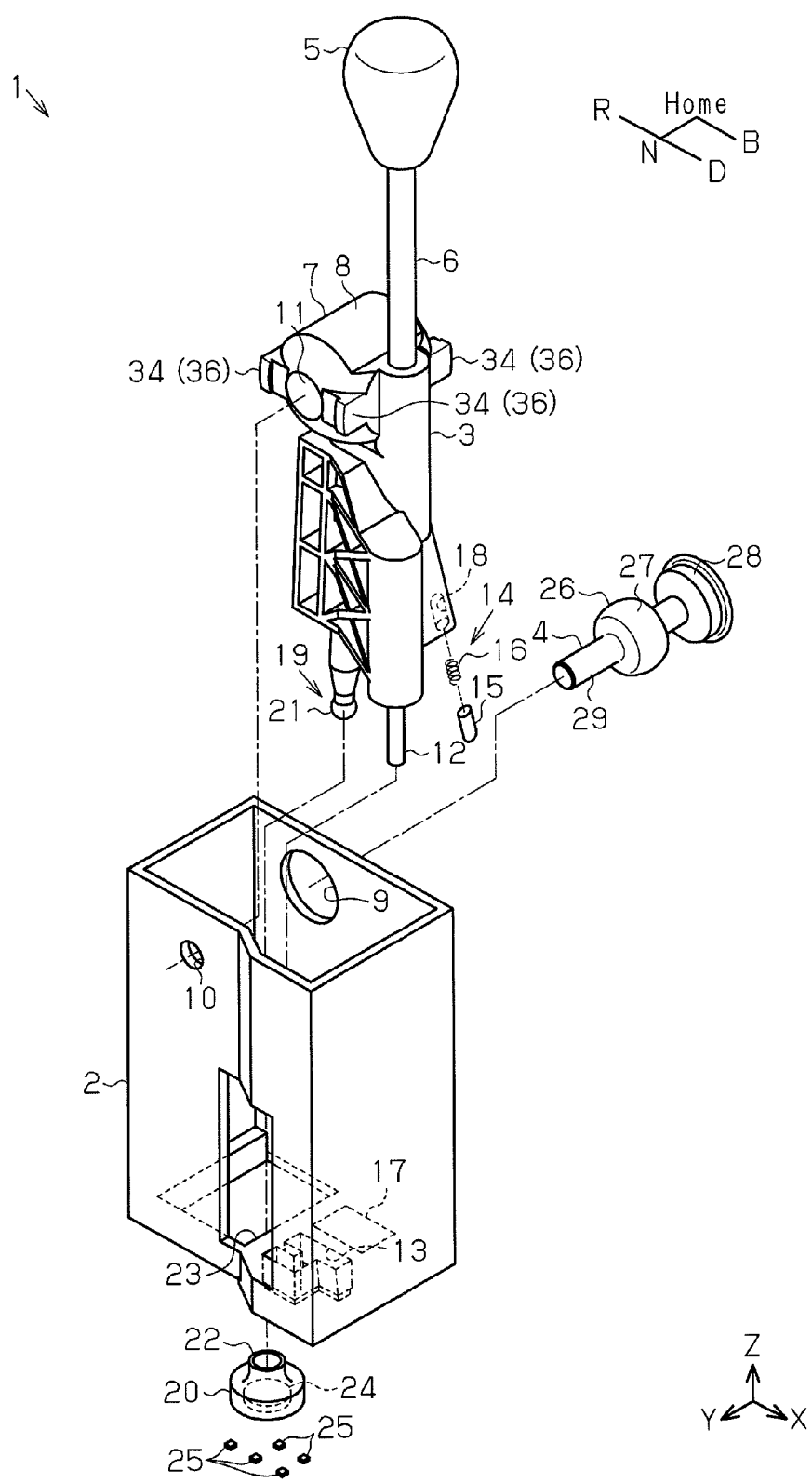
FIG. 3 is an exploded perspective view of the lever device.

As shown in FIG. 3, the lever 3 includes a lever rod 6 and a lever rod support 7. The lever rod 6 includes a distal portion to which a knob 5 is attached. The lever rod support 7 supports a basal portion of the lever rod 6. The lever rod 6 is, for example, rod-shaped and projects outward from the housing 2. The lever rod support 7 is accommodated in the housing 2. The lever rod support 7 may include a joint that is coaxial with the lever rod 6 and joined to the basal portion of the lever rod 6.

The lever 3 is coupled to the housing 2 by a single pivot shaft 4 (may be referred to as the shaft). The lever 3 includes a shaft coupling portion 8. The shaft coupling portion 8 includes an insertion bore 11, into which the shaft 4 is inserted. The shaft coupling portion 8 is included, for example, in the lever rod support 7. The shaft coupling portion 8 is located at a middle position of the lever 3 in the longitudinal direction (Z-axis in FIG. 3) of the lever 3. The shaft coupling portion 8 is located, for example, in an upper portion of the lever rod support 7. In the illustrated example, the insertion bore 11 of the shaft coupling portion 8 is located at a position that is offset in an X-direction shown in FIG. 3 from an axis of the lever rod 6. However, the insertion bore 11 may be located on the axis of the lever rod 6.

Through holes 9, 10 extend through opposing side walls of the housing 2. When the shaft 4 is inserted through the through holes 9, 10 of the housing 2 and the insertion bore 11 of the shaft coupling portion 8, the lever 3 is pivotally coupled to the housing 2.

The lever device 1 may include a guide mechanism that guides movement (shift operation and select operation) of the lever 3. The guide mechanism includes a guide pin 12, which projects from the lever rod support 7, and a guide groove 13, which is located in the housing 2 and receives the guide pin 12. The guide groove 13 is shaped in conformance with a movement path of the lever 3. In the illustrated example, the guide groove 13 is an h-shaped groove, which corresponds to an "h" gate pattern.

A click mechanism 14 is located between the housing 2 and the lever rod support 7. The click mechanism 14 includes a detent pin 15, a urging component 16, which may be a spring that urges the detent pin 15, and a pin receptacle 17 including recesses each of which receives an end of the detent pin 15. The detent pin 15 and the urging component 16 are attached to, for example, a lower portion 18 of the lever rod support 7, and move integrally with the lever rod support 7. The pin receptacle 17 is located in the housing 2.

A magnet component 20 is joined to the lever rod support 7 by a ball joint 19. The ball joint 19 includes a ball stud 21, which is separated from the lever rod 6, and a ball seat 22 included in the magnet component 20. The ball stud 21 is inserted through a bottom window 23 of the housing 2 and joined to the magnet component 20. The magnet component 20 moves in accordance with movement of the lever 3. When a magnetic sensor 25 detects the position of a magnet 24 included in the magnet component 20, the lever device 1 detects the shift position of the lever 3. The magnet 24 is opposed to the magnetic sensor 25 by the ball joint 19 regardless of the position of the lever 3. The magnetic sensor 25 is, for example, a magnetoresistive effect element.

Figure 2:
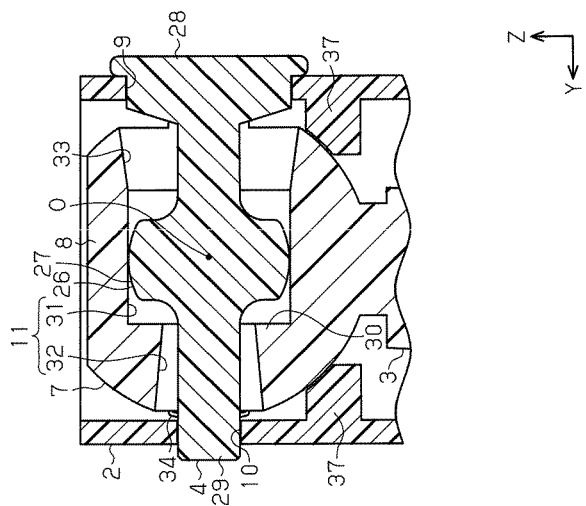
FIG. 2 is a cross-sectional view of the lever device taken along line II-II in FIG. 1.

As shown in FIG. 2, the shaft 4 includes a lever support 26, which supports the lever 3 so that the lever 3 may pivot in multiple directions. The lever support 26 includes a curved surface 27 that supports the lever 3. The curved surface 27 is shaped so that the lever 3 may pivot in multiple directions including a first direction (e.g., shift direction F1) and a second direction (e.g., select direction F2).

As shown in FIG. 3, the shaft 4 includes a head 28 and a rod 29. The lever support 26 is located, for example, at an intermediate position between the head 28 and a distal end of the rod 29. The curved surface 27 of the lever support 26 is bulged. In the example shown in FIG. 2, the lever support 26 has the form of a barrel that is formed by removing portions of a first sphere having a predetermined first radius so that a spherical surface of the first sphere partially remains. The portion of the first sphere defines the curved surface 27. The lever support 26 may be spherical when the lever support 26 includes a curved surface 27 that conforms to a peripheral surface of the first sphere. The diameter of the first sphere is the same as or slightly smaller than the diameter of the insertion bore 11 (large bore 31, which will be described later) of the shaft coupling portion 8. The lever support 26 may have the form of a spherical surface having two cutaway ends that are located in a direction (Y-axis direction in FIG. 2). The lever 3 is supported by the shaft 4 so that the lever 3 may pivot in any directions about a center O of a circle shaped in conformance with an outline of the lever support 26 having the spherical surface.

The insertion bore 11 of the shaft coupling portion 8 is defined by the large bore 31, a small bore 32, and a step 30. When the curved surface 27 of the lever support 26 of the shaft 4 is in contact with a surface of the large bore 31, the lever 3 is pivotally supported by the shaft 4. The large bore 31 may include a tapered opening 33 at a side opposite to the small bore 32. The tapered opening 33 may have a tapered angle and a diameter in accordance with an angle at which the lever 3 is allowed to pivot in the second direction (e.g., select direction F2). The small bore 32 may include a tapered opening having a smaller diameter than the tapered opening 33.

Figure 4:
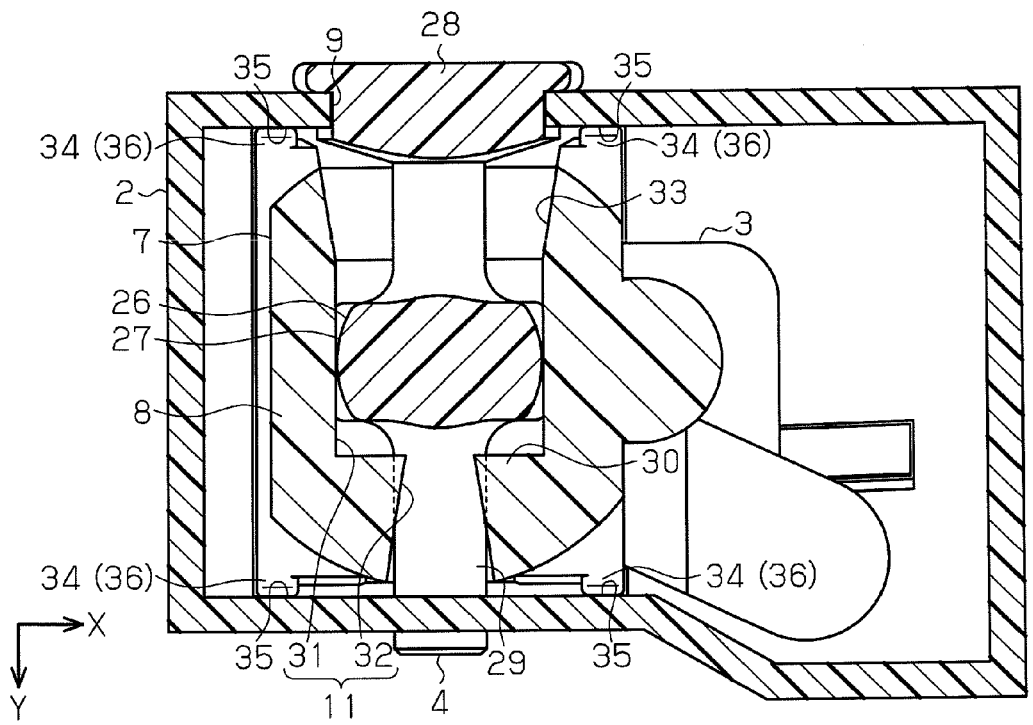
FIG. 4 is a cross-sectional view of the lever device taken along line in FIG. 1.
Figure 5:
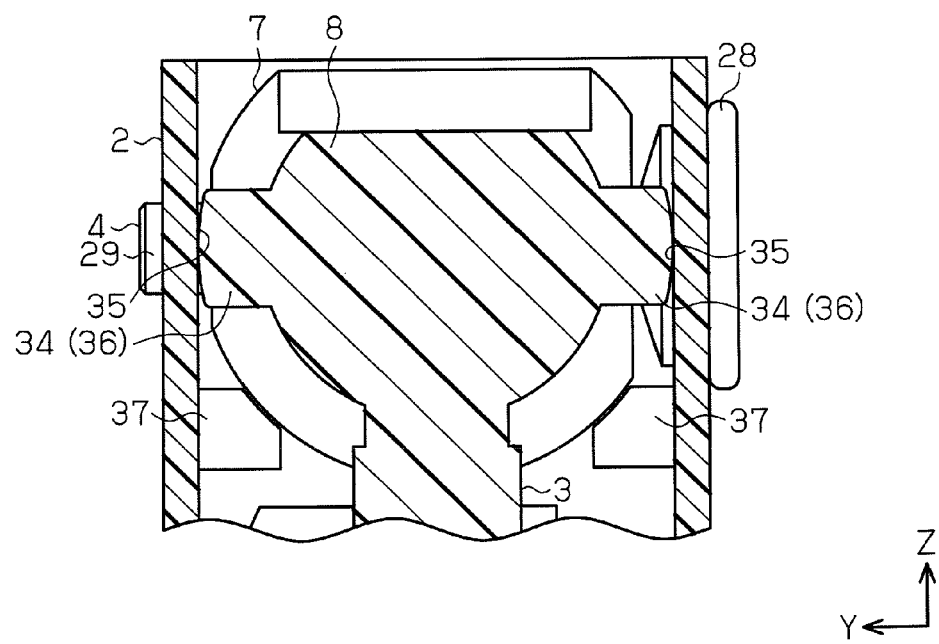
FIG. 5 is a cross-sectional view of the lever device taken along line IV-IV in FIG. 1.

As shown in FIGS. 4 and 5, the lever device 1 includes contact portions 34, which cooperate with the lever support 26 to allow the lever 3 to move in multiple directions. The contact portions 34 are included in one or each of the housing 2 and the lever 3. Alternatively, the contact portions 34 are located between the housing 2 and the lever 3. The contact portions 34 bring the lever 3 and the housing 2 into contact at a position separated from two ends of the shaft 4 regardless of the pivot angle of the lever 3. This stabilizes the pivoting of the lever 3. The contact portions 34 are located, for example, on the shaft coupling portion 8. Each contact portion 34 includes a curved surface 36, which functions as a slide portion. When the lever 3 pivots in multiple directions, the curved surfaces 36 move in contact with inner surfaces 35 of the housing 2. As shown in FIG. 5, each curved surface 36 may be bulged. The curved surfaces 36 may be distal surfaces of projections projecting from the shaft coupling portion 8 toward the inner surfaces of the housing 2. A plurality of curved surfaces 36 may be arranged on the shaft coupling portion 8 so that each end portion of the shaft 4 is located between two curved surfaces 36. In this case, each curved surface 36 is in contact with the housing 2 at a position separated from the end portions of the shaft 4.

As shown in FIGS. 2 and 5, the housing 2 accommodates one or more support projections 37 that support the shaft coupling portion 8 from below when coupling the shaft 4. In the embodiment, the shaft coupling portion 8 includes a semispherical lower portion, and each support projection 37 includes a concave support surface in conformance with the semispherical lower surface of the shaft coupling portion 8. The housing 2 may include a plurality of support projections 37 to stabilize the shaft coupling portion 8 and allow for smooth pivoting of the lever 3. The support projections 37 are separated from the contact portions 34 and located, for example, below the contact portions 34.

The operation of the lever device 1 will now be described with reference to FIGS. 6 and 7.

When the lever 3 is operated in the select direction (home position to N position), the lever 3 pivots about the center O of the lever support 26 as indicated by arrow F2' shown in FIG. 6. While the lever 3 is moving, an inner surface of the insertion bore 11 (large bore 31) of the shaft coupling portion 8 moves in contact with a surface (curved surface 27) of the lever support 26, and the curved surfaces 36 of the shaft coupling portion 8 move in contact with the inner surfaces 35 of the housing 2.

When the magnetic sensor 25 detects that the lever 3 has been shifted to the N position, the lever device 1 sends an N position detection signal to an electronic control unit (ECU) of the vehicle. The ECU switches the gear change device to an N mode in accordance with the N position detection signal.

When the lever 3 is operated in the shift direction (N position to D position), the lever 3 pivots about a longitudinal axis L1 of the shaft 4 as indicated by arrow F1' shown in FIG. 7. While the lever 3 is pivoting, the curved surfaces 36 of the shaft coupling portion 8 move in contact with the inner surfaces 35 of the housing 2.

When the magnetic sensor 25 detects that the lever 3 has been shifted to the D position, the lever device 1 sends a D position detection signal to the ECU. The ECU switches the gear change device to a D mode in accordance with the D position detection signal.

The movement directions of the lever 3 only differ when the lever 3 is moved to the R position or the B position and when the lever 3 returns to the home position. Thus, such operations will not be described in detail.

The lever 3 is coupled to the housing 2 by the single shaft 4. The shaft 4 includes the lever support 26 including the curved surface 27. Thus, the lever 3 may pivot in multiple directions including the shift direction and the select direction. This eliminates the need for a shaft dedicated to the pivoting in the shift direction and a shaft dedicated to the pivoting in the select direction. Thus, the number of components in the lever device 1 may be reduced.

The structure of the embodiment has the advantages described below.

(1) The lever device 1 includes the lever 3 including the shaft coupling portion 8, the shaft 4 having the longitudinal axis L, and the housing 2 supporting the shaft 4. The shaft 4 is inserted through the insertion bore 11 of the shaft coupling portion 8. The shaft 4 includes the lever support 26 supporting the lever 3 in the insertion bore 11 so that the lever 3 is movable in multiple directions including the first direction and the second direction. The lever device 1 includes the contact portions 34 including the curved surfaces, which allow the lever 3 to move in the multiple directions with the lever 3 and the housing 2 in contact with each other. In this structure, when the lever 3 is moved in the shift direction F1, the lever 3 pivots about the longitudinal axis L of the shaft 4, and the contact portions 34 move in contact with the inner surfaces 35 of the housing 2. When the lever 3 is moved in the select direction F2, the lever 3 pivots about the center O of the lever support 26, and the contact portions 34 move in contact with the inner surfaces 35 of the housing 2. The lever 3 is coupled to the housing 2 by the single shaft 4. This reduces the number of components in the lever device 1. Additionally, the contact portions 34 stabilize the pivoting of the lever 3.

(2) The lever support 26 includes the spherical curved surface 27. The spherical curved surface 27 of the lever support 26 stabilizes and balances the pivoting of the lever 3.

(3) The contact portions 34 are located at opposite sides of the lever 3, that is, opposite sides of the lever rod 6 located along the longitudinal axis L1 of the shaft 4. Thus, the lever 3 is stably supported by the housing 2. Further, the lever 3 stably pivots.

(4) The contact portions 34 are formed integrally with the shaft coupling portion 8. This does not increase the number of components.

(5) The insertion bore 11 of the shaft coupling portion 8 includes the tapered opening 33 adjacent to one end (e.g., head 28) of the shaft 4. The tapered opening 33 functions as a guide surface when the shaft 4 is inserted into the insertion bore 11. This facilitates the task for inserting the shaft 4 into the insertion bore 11.

(6) The support projections 37, which are located on the inner surface of the housing, support the lever support 26 from below. When the lever 3 is coupled to the housing 2 by the shaft 4, the support projections 37 prevent or limit the lever 3 from falling. This also facilitates the task for inserting the shaft 4 into the through holes 9, 10 of the housing 2 and the insertion bore 11 of the shaft coupling portion 8. This improves the coupling efficiency of the lever 3.

The embodiment may be modified as follows.

The step 30 of the insertion bore 11 may be omitted. The insertion bore 11 does not have to include the tapered opening 33.

It is preferred that the lever support 26 include the spherical curved surface 27. However, the lever support 26 may be changed to various shapes as long as the lever 3 is pivotally supported from below.

The number of contact portions 34 only needs to be at least one.

The contact portions 34 are not limited to contact portions arranged on the shaft coupling portion 8 and may be arranged in the housing 2. The contact portions 34 may be, for example, concave surfaces arranged in inner surfaces 35 of the housing 2 that are in contact with the lever 3. The contact portions 34 may include the concave surfaces and the bulged surfaces 36 of the shaft coupling portion 8.

The contact portions 34 may be dedicated members that are located between the lever 3 and the housing 2 or on each of the lever 3 and the housing 2.

The contact portions 34 (curved surfaces 36) may be located at positions other than the shaft coupling portion 8.

The shaft 4 does not have to be located at the longitudinally middle position of the lever 3 and may be located at a different position, for example, a lower end of the lever 3.

The multiple directions including the first direction and the second direction may be changed as long as the directions intersect with each other.

The lever 3 may be operated in three or more directions.

The structure and shape of the lever 3 may be changed.

The first direction may be changed to a direction other than the shift direction. The second direction may be changed to a direction other than the select direction.

The positions of the guide pin 12, the guide groove 13, the click mechanism 14, the ball joint 19, and the magnet component 20, and the like may be changed.

The lever device 1 is not limited to the momentary type and may be a stationary type.

The lever device 1 is not limited to a lever device applied to a vehicle and may be applied to any device, apparatus, and system.

The present invention is not limited to the illustrated drawings and embodiments. This should not be interpreted as intending that an unclaimed disclosed feature is essential to any claim. Rather, inventive subject matter may lie in less than all features of a particular disclosed embodiment. The scope of the invention should be determined with reference to the appended claims, along with the full scope of equivalents to which such claims are entitled.

What is claimed is:

1. A lever device comprising:
   a lever;
   a shaft having a longitudinal axis and including two ends;
   a housing including opposing first and second side walls, the first side wall and the second side wall having a first through hole and a second through hole, respectively, wherein the housing pivotally supports the two ends of the shaft in the first and second through holes of the opposing first and second side walls;
   a shaft coupling portion included in the lever and including an insertion bore through which the shaft is inserted;
   a lever support integrally formed on the shaft, wherein the lever support is located in the insertion bore of the shaft coupling portion and supports the lever so that the lever is movable in multiple directions including a first direction and a second direction that intersects with the first direction; and
   a contact portion included in one or each of the housing and the lever or located between the housing and the lever, wherein
   the contact portion includes a curved surface that allows the lever to move in the first direction and the second direction with the lever and the housing in contact with each other, and
   the curved surface of the contact portion is a bulged surface that lies on a peripheral surface of the lever at a position separated from the shaft and in contact with an inner surface of the housing.

2. The lever device according to claim 1, wherein the lever support includes a spherical curved surface.

3. The lever device according to claim 1, wherein the contact portion is located at opposite sides of the lever.

4. The lever device according to claim 1, wherein the contact portion is integrally formed with the shaft coupling portion.

5. The lever device according to claim 1, wherein the insertion bore of the shaft coupling portion includes a tapered opening adjacent to one end of the shaft.

6. The lever device according to claim 1, wherein the housing includes a support projection that supports the shaft coupling portion from below at a position below the shaft, and
   the contact portion is in contact with the inner surface of the housing at a position differing from the support projection.

7. The lever device according to claim 1, wherein the contact portion is in contact with the inner surface of the housing at a position separated from the shaft and stabilizes pivoting of the lever regardless of a pivot angle of the lever.

* * * * *